United States Patent [19]

Francisco

[11] Patent Number: 4,845,715
[45] Date of Patent: Jul. 4, 1989

[54] METHOD FOR MAINTAINING DATA PROCESSING SYSTEM SECURING

[76] Inventor: Michael H. Francisco, 1276 Stradella Rd., Los Angeles, Calif. 90077

[21] Appl. No.: 65,169

[22] Filed: Jun. 17, 1987

Related U.S. Application Data

[63] Continuation of Ser. No. 665,786, Oct. 29, 1984, abandoned.

[51] Int. Cl.[4] .................. G06F 07/02; G06F 11/28
[52] U.S. Cl. ................................ 371/53; 371/57; 364/200; 364/286.4
[58] Field of Search ............... 364/200, 900; 371/21, 371/51, 53, 57

[56] References Cited

U.S. PATENT DOCUMENTS

| | | | |
|---|---|---|---|
| 3,458,860 | 7/1969 | Shimabukuro | 371/53 |
| 3,806,882 | 4/1974 | Clarke | 364/200 |
| 3,984,637 | 10/1976 | Caudill et al. | 364/200 |
| 4,262,329 | 4/1981 | Bright et al. | 364/200 |
| 4,310,720 | 1/1982 | Check, Jr. | 364/900 |
| 4,446,519 | 5/1984 | Thomas | 364/300 |
| 4,458,315 | 7/1984 | Uchenick | 364/200 |
| 4,519,077 | 5/1985 | Amin | 371/21 |
| 4,558,416 | 12/1985 | Pauweels et al. | 364/900 |

*Primary Examiner*—Eddie P. Chan

[57] ABSTRACT

A method of maintaining software program integrity and security in data processing systems through generation of a stored first selective electronic identification indicia that is uniquely characteristic of the total number of binary 1's and binary 0's of a software program in association with a stored plurality of selective third electronic indicia that individually identify authorized users of such program and generating a second electronic identifying indicia in response to a request by a prospective user for access to said program and releasing such requested program only when the first and second electronic identifying indicia are identical and when the requesting user's identification indicia corresponds with one of said third stored electronic indicia.

2 Claims, 1 Drawing Sheet

METHOD FOR MAINTAINING DATA PROCESSING SYSTEM SECURING

This is a continuation of application Ser. No. 665,786 filed Oct. 29, 1984, now abandoned.

BACKGROUND OF THE INVENTION

This invention relates to data processing system security and more particularly to a method for maintaining integrity through selectively coded preauthorized software program and user identification and subsequent automatic authentication of both a selected program and permitted user thereof when system resources are to be utilized.

BACKGROUND OF THE INVENTION

The maintenance of data processing system security poses ever expanding problems due in part to the continual increase of masses of proprietary information being stored in such systems and the continual increase in the number of people who are becoming highly knowledgeable as to the nature and modes of operation of data processing systems and techniques employed therein. One area of growing primary concern is the controlling of access to, and the maintaining of integrity of, proprietary software program material in large business-type concerns, where unauthorized access to program material and/or loss of program integrity in conjunction with available stored data can lead to serious breaches of system security as well as to serious errors that materially affect the proprietary value of the program and the accuracy of information that results from usage thereof.

SUMMARY OF THE INVENTION

The invention may be briefly described as an improved method for maintaining the integrity of a data processing system through controlled authentication and subsequent authorization of both selected programs and potential users thereof. In its broader aspects, the invention includes the generation and storage of a selective electronic identification indicia, based upon the nature and content of the program itself, for each software program in the system together with a separately stored correlation of such electronic identification indicia with user identity therewith in association with a regeneration of such electronic identification indicia each time the program is sought to be used and a checking of said regenerated electronic identification indicia against a stored catalog of such identification indicia and against a stored permitted user register therefore.

Among the advantages of the subject invention is a markedly improved system security to ensure only utilization of authenticated programs, the utilization of such programs only by authorized users thereof and the immediate detection of any modifications or changes introduced into a software program.

The primary object of this invention is the provision of an improved method of maintaining data processing system integrity and security.

Other objects and advantages of the subject invention will become apparent from the following portions of this specification and from the appended drawings which illustrate, in accordance with the mandate of the patent statutes, a presently preferred embodiment of a method incorporating the principles of this invention.

DESCRIPTION OF THE PREFERRED EMBODIMENTS

Figure 1:
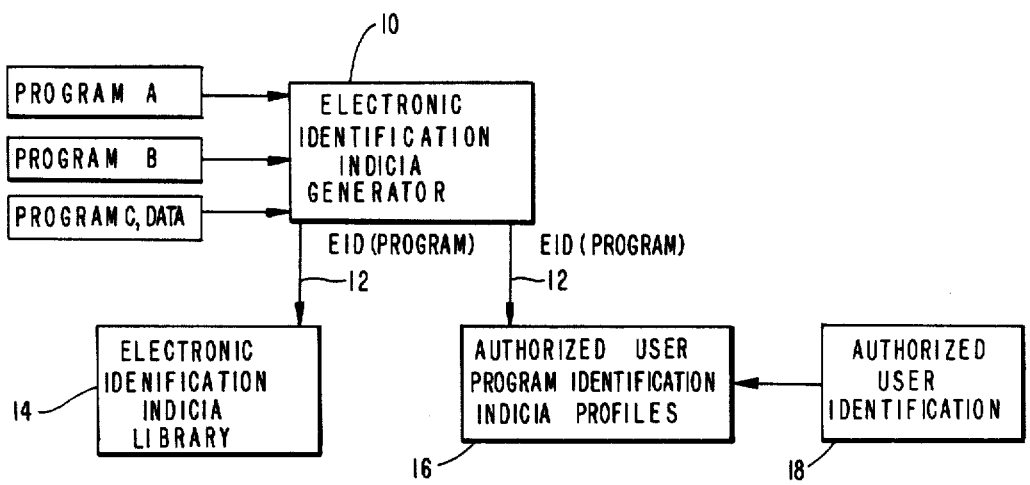
FIG. 1 is a schematic flow chart illustrative of library type storage of electronic identification indicia for both software programs and authorized user profiles therefore.

Referring to the drawings, the initial step of the practice of this invention is the generation of a selective electronic identification indicia for each software program that is to be authorized for use within a particular information handling system. Such a program, for example, Program A which may broadly be considered as an arbitrarily ordered series of actions or instructions, in binary form, capable of being interpreted and executed by an information processing system for the purpose of manipulating information, is introduced into an electronic identification indicia generator 10. The generator 10, which is suitably a section of a general purpose digital computer, such as an IBM 370 or the like, or a preprogrammed microprocessor, such as a MOTOROLA 68020 microprocessor, or portion thereof, is adapted to generate a first electronic identification indicia 12 (EID-Program A) that uniquely and selectively identifies the submitted program. By way of example, in a relatively simple approach thereto such generator 10 could generate a selective and unique electronic identification indicia by use of a preprogrammed algorithm in accord with which the total number of ones and zeroes in the binary coded input Program A could be totalled; the total number of "ones" multiplied by an arbitrary number, e.g. 22; the product of such multiplication could then be divided by the number of zeros in the binary coded program; and the remainder thereof be modified by addition to (or subtraction therefrom) of an arbitrary number, i.e. 7. The resulting electronic numerical indicia would then, in all probability, be selectively unique for the particular program. The algorithm would be periodically varied to enhance system security.

This first electronic identification indicia 12 for a particular program, herein termed EID (Program A), is stored, together with similarly generated indicia for other programs B, C, D..., in an EID library 14, which could suitably be a read only memory (ROM) or a random access memory unit (RAM).

The first electronic identification indicia 12 for the program, i.e. EID (Program A), is also entered in an authorized user profile library 16, again suitably a ROM or RAM, in correlative relation with an appropriate electronic identification of all authorized users thereof. As shown, electronic identifications of all authorized users are introduced from a source 18 thereof and entered into the authorized user library 16 and there correlated with the electronic identification indicia of the particular programs authorized for usage by each such user. This second memory may be considered as an authorized user profile as it includes a correlation of authorized user identification with all programs which each such user is entitled to use.

Figure 2:
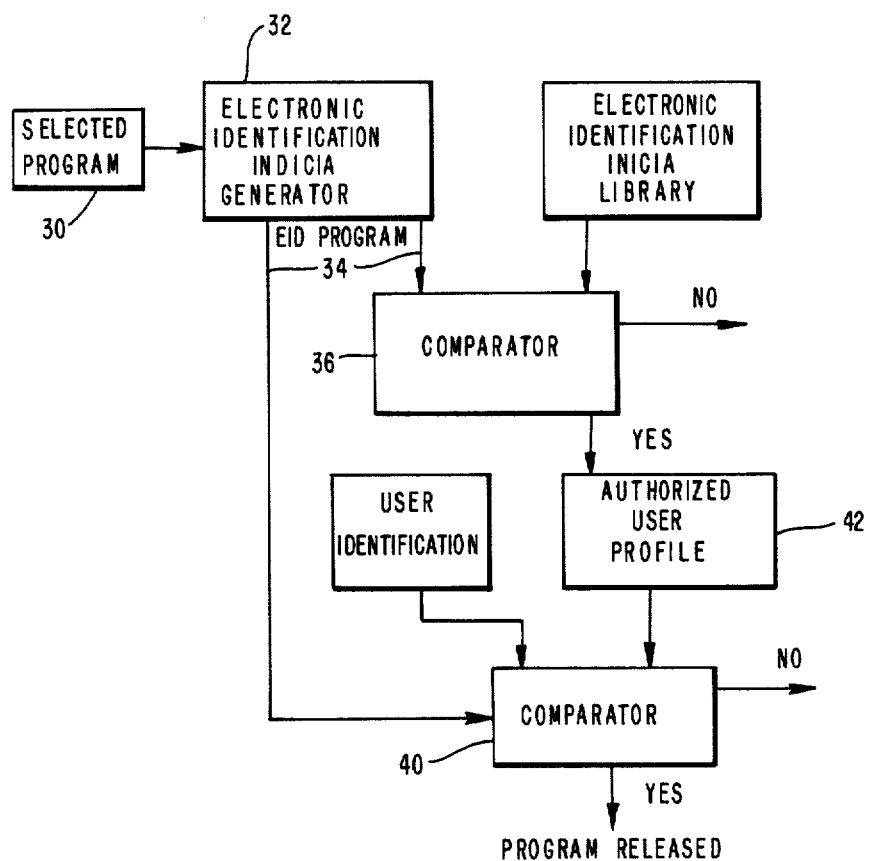
FIG. 2 is a schematic flow chart illustrative of the practice of the method steps of this invention.

As shown in FIG. 2 in the practice of the herein disclosed method, a selected program 30 requested to be released for use is introduced into an electronic identification indicia generator 32 and to therein generate a second electronic identification signal 34 (EID-Program S). This second electronic identification indicia 34 is first introduced into a comparator 36 together with the first electronic identification indicia 12, for such selected program (EID-Program S), the latter being retrieved from the library 14. Such comparator 36 may suitably comprise an automatic logic unit of a general purpose digital computer. If such first and second electronic identification indicia 12 and 34 for the selected Program S do not match, it is indicative of the fact that the requested program differs in some respects from the base or true program from which the first electronic identification indicia 12 (EID-Program S) was derived and such lack of match serves as a signal to management or to the system monitor to take appropriate investigative and corrective action.

If, on the other hand, the first and second electronic identification indicia 12 and 34 match, the selected program 30 is thus indicated to be authentic and in proper condition for use. At this time, the electronic identification of the user making the request for access is introduced into a second comparator 40. The comparator 40 may again suitably comprise the automatic logic unit of a general purpose digital computer. Also introduced into the second comparator 40 is the second electronic identification indicia 34 emanating from the generator 32 and the authorized user profile 42 obtained from the profile register 16.

If the paired inputs to the second comparator do not match, the requested program 30 will not be released for use and an appropriate signal made to the system monitor to initiate appropriate investigative and corrective action. If, however, the paired signal inputs to the second comparator 40 provide a match, the requested program 30 may be released for use by the particular identified user.

Having thus described my invention, I claim:

1. A method for maintaining the security and integrity of the content of proprietary software programs in data processing systems and wherein each of said programs are individually accessable from a central stored source thereof and each contain a predetermined number of binary 1's and a predetermined number of binary 0's therein, comprising the steps of counting the number of binary 1's contained in each of said programs, counting the number of binary 0's contained in each of said programs, generating a first selective electronic identification indicia for each of said programs that is uniquely characteristic of said total number of binary 1's and total number of binary 0's therein by applying a predetermined algorithm to said counted total number of binary 1's and counted total number of binary 0's contained in each of said programs;

storing said first selective electronic identification indicia in a first memory associated with said central stored program source, counting, in response to a request by a prospective user for access to a particular stored software program, the total number of binary 1's and the total number of binary 0's contained in said particular requested stored program, generating a second selective electronic identification indicia for said particular requested stored program by applying said predetermined algorithm to said counted total number of binary 1's and counted total number of binary 0's contained in said particular requested program, comparing said first selective electronic identification indicia for said particular requested program stored in said first memory with said second electronic identification indicia generated in response to the request for access thereto, and accessing said requested program to said requesting prospective user only when said first selective electronic indentification indicia for the requested program is identical with said second selective electronic identification indicia for said requested program.

2. The method as set forth in claim 1 further including the steps of generating at least one third selective electronic identification indicia uniquely identifying at least one user having authorized access to one or more of said stored programs, storing said first selective electronic identification indicia for each of said programs in operative association with each of said third selective electronic identification indicia identifying authorized users thereof in a second memory associated with said central stored program source, generating, at the time of a prospective user request for access to a particular program, a fourth selective electronic identification indicia representative of the identity of said prospective user requesting access to said particular software program, and making said particular program available to said requesting user only if said first and second selective electronic identification indicia are indentical to each other and said fourth selective electronic indicia is identical with one of said third selective electronic identification indicia stored in said second memory.

* * * * *

UNITED STATES PATENT AND TRADEMARK OFFICE
CERTIFICATE OF CORRECTION

PATENT NO. : 4,845,715

DATED : July 4, 1989

INVENTOR(S) : Michael H. Francisco

It is certified that error appears in the above-identified patent and that said Letters Patent is hereby corrected as shown below:

Title page and Column 1, line 3,

In the Title, change "SECURING" to -- SECURITY --;

Column 1, line 2 change "SECURING" to -- SECURITY --;

Column 1, line 8 delete "BACKGROUND OF THE INVENTION".

Signed and Sealed this

Twenty-ninth Day of May, 1990

*Attest:*

HARRY F. MANBECK, JR.

*Attesting Officer*      *Commissioner of Patents and Trademarks*